US009030406B2

(12) United States Patent
Nobakht

(10) Patent No.: US 9,030,406 B2
(45) Date of Patent: May 12, 2015

(54) REMOTE CONTROL FUNCTIONALITY INCLUDING INFORMATION FROM MOTION SENSORS

(75) Inventor: Amir Nobakht, Los Gatos, CA (US)

(73) Assignee: Viaclix, Inc., Los Gatos, CA (US)

(*) Notice: Subject to any disclaimer, the term of this patent is extended or adjusted under 35 U.S.C. 154(b) by 375 days.

(21) Appl. No.: 13/236,520

(22) Filed: Sep. 19, 2011

(65) Prior Publication Data

US 2012/0068922 A1 Mar. 22, 2012

Related U.S. Application Data

(60) Provisional application No. 61/384,113, filed on Sep. 17, 2010.

(51) Int. Cl.
G09G 5/00 (2006.01)
G06F 3/02 (2006.01)
H04N 21/266 (2011.01)
G06F 3/023 (2006.01)
G06F 3/0346 (2013.01)
G06F 3/0481 (2013.01)

(52) U.S. Cl.
CPC ............ G06F 3/0219 (2013.01); H04N 21/266 (2013.01); G06F 3/0231 (2013.01); G06F 3/0346 (2013.01); G06F 3/0481 (2013.01); G06F 2203/04806 (2013.01)

(58) Field of Classification Search
None
See application file for complete search history.

(56) References Cited

U.S. PATENT DOCUMENTS

| 5,895,462 | A | 4/1999 | Toki |
|---|---|---|---|
| 6,037,934 | A | 3/2000 | Himmel et al. |
| 7,500,202 | B2* | 3/2009 | Gerba et al. ................... 715/856 |
| 8,223,125 | B2* | 7/2012 | Yen ................................ 345/163 |
| 2008/0134307 | A1* | 6/2008 | Ashkenazi et al. ............... 726/6 |
| 2009/0144204 | A1* | 6/2009 | Hurry ............................. 705/71 |
| 2010/0013860 | A1 | 1/2010 | Mandella et al. |
| 2010/0149432 | A1 | 6/2010 | Roberts et al. |
| 2010/0171636 | A1 | 7/2010 | Lee et al. |
| 2011/0018803 | A1* | 1/2011 | Underkoffler et al. ........ 345/158 |
| 2012/0013536 | A1* | 1/2012 | VanDuyn et al. ............. 345/169 |

FOREIGN PATENT DOCUMENTS

| JP | 11-004416 A | 1/1999 |
|---|---|---|
| JP | 11-331181 A | 11/1999 |
| WO | WO 99/22305 A | 5/1999 |
| WO | WO 99/54803 A | 10/1999 |

OTHER PUBLICATIONS

International Search Report and Written Opinion issued Jan. 19, 2012 for PCT/US2011/52181.

* cited by examiner

*Primary Examiner* — Jason Olson
(74) *Attorney, Agent, or Firm* — Pillsbury Winthrop Shaw Pittman LLP

(57) ABSTRACT

According to some aspects, the invention provides methods and apparatuses for incorporating motion sensors into a full function remote control. In addition to using movement for cursor location on an associated display, the invention can use the motion sensor information in many new and useful ways. As one example, information about movement along the ±Z axis can be used to activate a "zoom in" function when remote pointed toward the screen and "zoom out" when it is pulled back. As another example, a remote control incorporating the invention can include controls on two opposite sides, and the motion sensors can be used to activate controls on one side of the device and deactivate controls on the other side based on its orientation.

2 Claims, 3 Drawing Sheets

REMOTE CONTROL FUNCTIONALITY INCLUDING INFORMATION FROM MOTION SENSORS

CROSS-REFERENCE TO RELATED APPLICATIONS

The present application claims priority to U.S. Provisional Patent Application No. 61/384,113, filed Sep. 17, 2010, the contents of which are incorporated herein by reference in their entirety.

FIELD OF THE INVENTION

The present application relates to electronic devices, and more particularly to a remote control with motion sensors for controlling option selections and the like.

BACKGROUND OF THE INVENTION

Remote controls, for example, for controlling selection of viewing options on a television monitor or the like, are well known. However, they typically only include keypads, buttons, and other input means for controlling selections.

Some game devices (e.g. Nintendo Wii) have controllers with embedded motion sensors to control game action and also some game selections. However, these controllers have limited functionality for such selections (e.g. pointing to a button or object), and still require further manual inputs such as a button click.

Many electronic devices such as iPhone and iPad include embedded motion sensors, but these are typically used for game action or adjusting display orientations.

SUMMARY OF THE INVENTION

According to some aspects, the invention provides methods and apparatuses for incorporating motion sensors into a full function remote control. In addition to using movement for cursor location on an associated display, the invention can use the motion sensor information in many new and useful ways. As one example, information about movement along the ±Z axis can be used to activate a "zoom in" function when remote pointed toward the screen and "zoom out" when it is pulled back. As another example, a remote control incorporating the invention can include controls on two opposite sides, and the motion sensors can be used to activate controls on one side of the device and deactivate controls on the other side based on its orientation.

In accordance with these and other aspects, a remote control system in embodiments of the invention includes a remote control device that includes motion sensors; and a GUI function that receives information regarding movement from the motion sensors and controls content on a display based on the information, the controls including at least a zoom functionality.

In additional accordance with these and other aspects, a remote control system according to embodiments of the invention includes a remote control device that includes motion sensors and first and second sets of controls; and a GUI function that receives information regarding control selections using the first and second sets of controls and controls content on a display based on the information, wherein the remote control device selectively activates one of the first and second sets of controls based on information regarding movement from the motion sensors.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
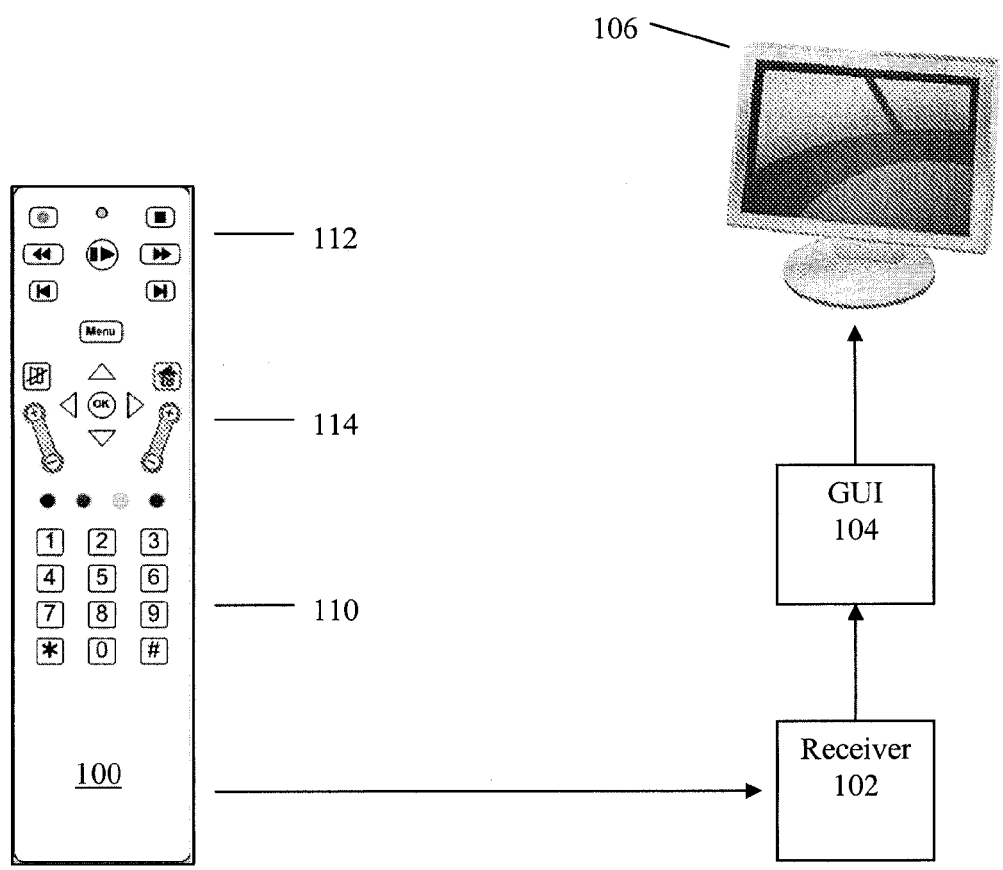
FIG. 1 is a functional block diagram illustrating certain general aspects of the invention.

FIG. 1 is a block diagram that illustrates general aspects of embodiments of the invention. As shown, a remote control device 100 communicates with a receiver 102. The receiver 102 is coupled to a graphical user interface 104 that controls a display 106. Device 100 includes conventional remote controls such as a numeric keypad 110, media playback controls 112, and menu controls 114, as well as a transmitter (not shown) to communicate control selections to receiver 102. According to aspects of the invention, however, device 100 further incorporates 3-axis motion sensors (gyro) such that displacement, velocity and acceleration as well as roll, pitch and yaw information is captured and sent to receiver 102. In addition to using the three axis movement communicated by device 100 for cursor location, GUI 104 can use the motion sensor information in many new and useful ways. As one example, information about movement along the ±Z axis can be used to activate a "zoom in" function when remote pointed toward the screen and "zoom out" when it is pulled back. As another example, and although not shown in detail in FIG. 1, the device 100 can include controls on an opposite side from controls 110, 112 and 114, and the motion sensors can be used to activate controls on one side of device 100 and deactivate controls on the other side based on its orientation.

Although shown separately in FIG. 1, receiver 102, GUI 104 and display 106 can be included in a single device such as a television. Alternatively, receiver 102 and GUI 104 can be included in a device such as a set top box, and display 106 can be a conventional television. Many other variations are possible. For example, receiver 102 and GUI 104 can be included in a personal computer running a conventional operating system such as Windows or Mac OS, either internally or externally (e.g. via a USB dongle or the like), or combinations of both. Still further, certain or all of the functionalities and/or components of device 100, GUI 104 and 106 can be incorporated into a single device such as a smart phone (e.g. iPhone, Android, etc.), a PDA, a tablet computer (e.g. iPad), a personal media player, etc. In such embodiments, receiver 102 may be unnecessary. Those skilled in the art will recognize how to adapt the invention for use in such various environments after being taught by the examples described herein.

As such, GUI 104 can be implemented depending on the particular environment. In one example where receiver 102 and GUI 104 are provided together in a set top box, GUI 104 can be software that receives information from receiver 102 and works with an embedded operating system and/or application software to control menu selections, media playback, zooming and panning, etc. In embodiments where receiver 102 and 104 are implemented in a personal computer, some or all of GUI 104 can be part of a device driver operating under an operating system such as Windows or Mac OS. Those skilled in the art will understand how to adapt GUI 104 for use with such various implementations after being taught by these examples. In particular, those skilled in the art will understand how to implement standard GUI functionalities such as cursor pointing, as well as screen zooming functionalities, using the motion sensor inputs of the invention after being taught by the present disclosure.

Communications between device 100 and receiver 102 can use any wireless or wired technology, such as IrDA, Bluetooth, WiFi, USB, etc. Moreover, well known protocols such as RF4CE, 802.15.4 can be used.

Figure 2:
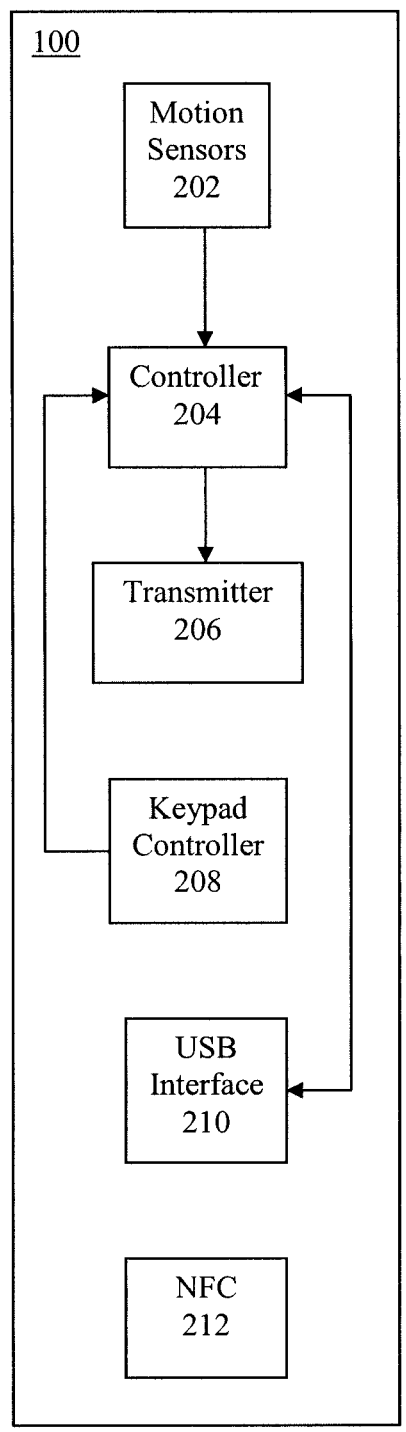
FIG. 2 is a block diagram illustrating an example embodiment of a remote control device for use in the present invention.

A block diagram illustrating an example embodiment of device 100 is provided in FIG. 2. As shown in this example, device 100 includes motion sensors 202, controller 204, transmitter 206, keypad controller 208, USB interface 210 and NFC 212.

In embodiments, motion sensors 202 can include any commercially available MEMS-type accelerometers and/or gyroscopes, such as a STMicroelectronics L3G3250A. Although full 3-axis motion (X, Y, Z) and orientation (roll, pitch, yaw) are preferred, detecting all axes of motion and orientation are not necessary.

In embodiments, controller 204 is a programmable processor such as a STMicroelectronics ST72F651AR6T1E that includes associated program and data memory (not shown) that implements the functionalities of the present invention. Those skilled in the art will understand how to implement this functionality in a processor after being taught by the present disclosure.

In embodiments, transmitter 206 is a wireless transmitter such as an infrared optical transmitter that is typically used in conventional remote control devices. In one example, transmitter 206 is a Sanyo LC7464M. In other embodiments, transmitter 206 is a radio transmitter such as Bluetooth or WiFi, or a wired interface such as USB (in which case interface 210 may be unnecessary).

In embodiments, keypad controller 208 is any conventional keypad controller that detects keypad presses and sends corresponding information to controller 204. In one example, keypad controller 208 is a Sanyo LC7464M. Those skilled in the art will appreciate that many alternative types of controllers can be used depending on the type and number of keypad inputs, such as touch pads, scroll wheels, etc.

In embodiments, USB interface 210 is a conventional USB interface that can be used to recharge a battery in device 100 (not shown) and/or to receive software updates for controller 204.

In embodiments, NFC 212 is a near-field communication (NFC) device, such as a Melexis MLX90131, using a communication protocol such as that defined by the NFC Forum. In example embodiments, this can be used to share profile information or credentials with a paired device. Additionally or alternatively, NFC can be used to pass secure information regarding payment, such as a token, pin or other form of identification to authorize to a bank account. For example, NFC 212 can be used in a security scheme to activate functionality with a paired device such as a computer or set top box and/or to activate functionalities and capabilities according to user profile, etc. It is possible that other security mechanisms can be used in addition to, or alternatively to NFC technology, including smart cards, login credentials, biometrics, etc.

In operation, general operation controller 204 receives information regarding movement from motion sensors 202 and information regarding control selections from keypad controller and formats and sends corresponding information via transmitter 206. It should be noted that motion information and keypad information can be used independently or in combination. Moreover, controller 204 can use movement information to activate and deactivate certain of controls from keypad controller 208. For example, depending on orientation as detected by sensors 202, controls on different sides of the device 100 can be activated and deactivated.

It should be apparent that other embodiments of device 100 can have fewer or additional components as illustrated in FIG. 1.

The following is a further detailed description of a device 100 in connection with an example implementation as a full function remote control and keyboard to support ViaCLIX Total Access Centers ("TAC") from Family Series V50xx and beyond, as well as providing a remote control that will work with television receivers attached to the V50xx Series systems. As such, the TAC incorporates the functionality of receiver 102 and GUI 104 as described above. In addition, this example implementation of device 100 provides full functionality for ViaBrowsers running under Windows 7 on industry standard personal computers. As should be appreciated, the invention is not limited to this example embodiment, but can be extended to use with other systems.

Cursor positioning of the Remote Control is enabled by the use of 3-axis motion sensors (gyro) providing a rapid cursor movement that can be scaled for individual capabilities for television viewing at a ten foot distance. Displacement, velocity and acceleration as well as roll, pitch and yaw may be provided for a wide range of applications running on the TAC. In addition to using the three axis for cursor location, the Remote Control will use movement along the ±Z axis to activate "zoom in" when remote pointed toward the screen and "zoom out" when it is pulled back.

Figure 3:
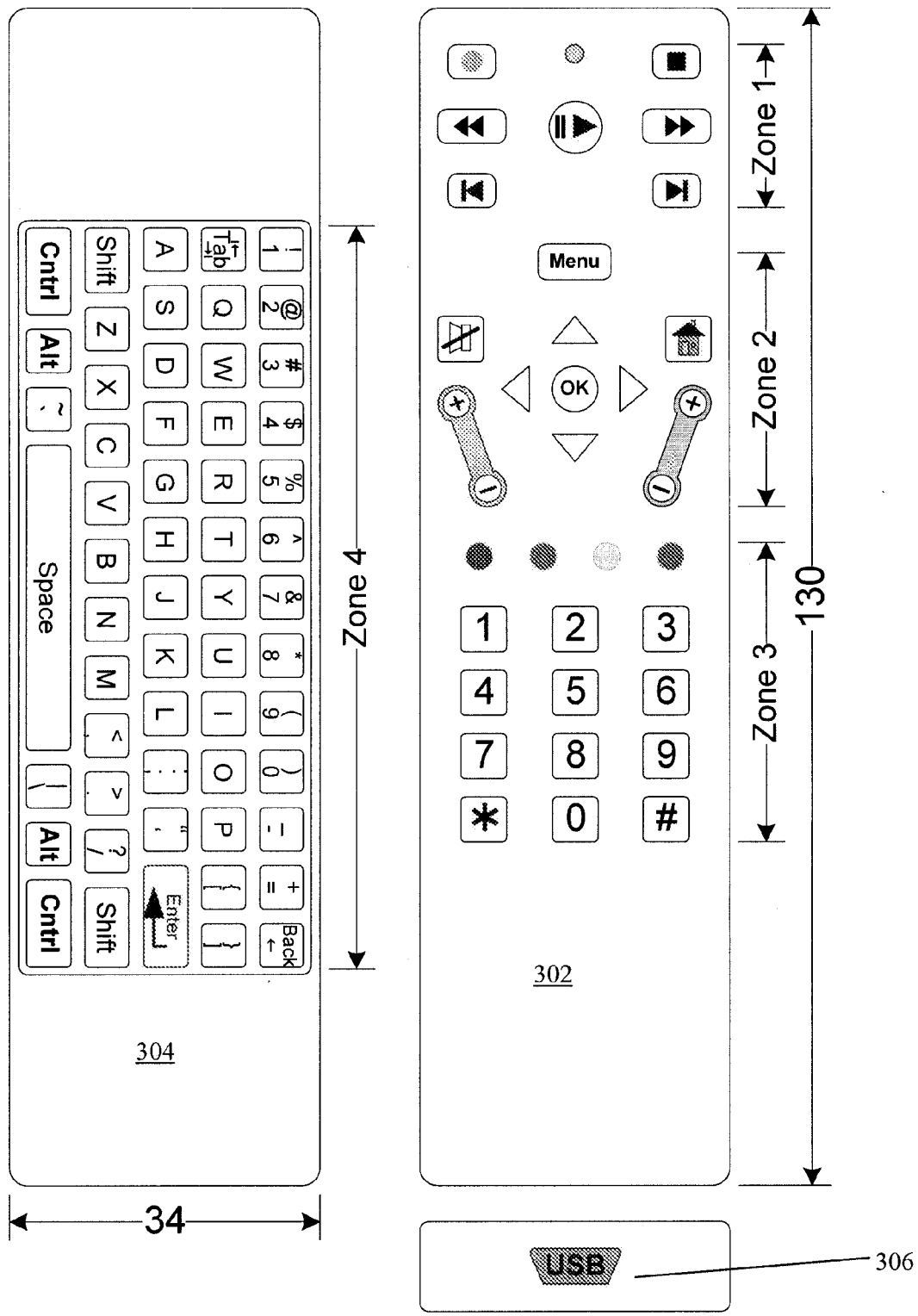
FIG. 3 provides front, back and side views of an example remote control in accordance with the invention.

An example embodiment is shown in FIG. 3, which shows top, bottom and side views of device 100. In this example, there are two active sides to the controller: one containing a television/media player Remote Control 302; and the other including a Remote Keyboard 304. When the Remote Control side of the controller is up, as determined by the gyro, the keys on the Remote Keyboard side of the controller are to be disabled, and vice versa. The television/media player control signals are transmitted via infra red signaling and the TAC control and data signals are transmitted via a 2.4 GHz radio frequency (RF4CE based upon 802.15.4) to a receiver 102 installed in the TAC. There is an infra red emitter 306 located in the top end of the Remote Control and a mini-USB ("Type B") on the bottom end for recharging and loading new software.

The RF4CE receiver 102 is located inside the TAC and can be interfaced to a USB input port on the receiving system. The Remote Control is "paired" with the receiver to minimize interference with other equipment in the home and the receiving system "wake on signal" is assumed.

Except for a broader range of control functions than are usually found on a remote control, the device 100 can perform in much the same way as any typical audio/video remote control. In embodiments, the device communicates with the TAC using a 2.4 GHz code scheme (RF4CE, 802.15.4) with human interface device (HID) codes for each key on control 302 and keyboard 304, as well as for detected motion from the embedded motion sensors. It can also communicate with the television using a "learning" infra red code.

The Remote Keyboard 304 preferably utilizes a Unicode two-byte code set to permit keyboard HID code modifications for international customization. The gyro subsystem generates the necessary control codes to permit at least the following data to be sent to the TAC receiver: ±X; ±Y; ±Z.

As shown in FIG. 3, in this example embodiment, remote control 302 includes the following controls: Zone 1—Audio/Video Controls; Zone 2—Navigation Control; and Zone 3—Special Function and Number Pad. Moreover, this example contains a charging control circuit that is powered from a standard USB "Type B," 5VDC power adaptor.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A remote control system, comprising:
   a remote control device that includes motion sensors and first and second sets of controls; and
   a display device having a GUI function that receives information regarding control selections using the first and second sets of controls and controls content on a display of the display device based on the information,
   wherein the remote control device selectively activates one of the first and second sets of controls based on information regarding movement from the motion sensors, and
   wherein the remote control device further includes a smart card and a near-field communication (NFC) device that communicates credentials from the smart card with the display device for enabling the control selections to control content on the display, and
   wherein the NFC device further communicates user profile information from the smart card with the display device, and wherein the display device is configured to activate functionalities in accordance with the communicated user profile information, wherein the NFC device and the display device are paired devices.

2. A remote control system, comprising:
   a remote control device that includes controls, a near-field communication (NFC) device and a smart card; and
   a display device having GUI function that receives information regarding control selections using the controls and controls content on a display of the display device based on the information,
   wherein the (NFC) device communicates credentials from the smart card with the display device for enabling the control selections to control content of the display, and
   wherein the NFC device further communicates user profile information from the smart card with the display device, and wherein the display device is configured to activate functionalities in accordance with the communicated user profile information, wherein the NFC device and the display device are paired devices.

* * * * *